United States Patent [19]

Schuck et al.

[11] 4,248,341

[45] Feb. 3, 1981

[54] ROLLER CONVEYOR AND ITS TRACK

[75] Inventors: Ludwig Schuck; Hermann Benz, both of Darmstadt, Fed. Rep. of Germany

[73] Assignee: Carl Schenck AG, Darmstadt, Fed. Rep. of Germany

[21] Appl. No.: 27,515

[22] Filed: Apr. 5, 1979

[30] Foreign Application Priority Data

Sep. 7, 1978 [DE] Fed. Rep. of Germany ....... 2838974

[51] Int. Cl.³ .............................................. B65G 13/07
[52] U.S. Cl. .................................................... 198/790
[58] Field of Search ................... 193/35 R, 37, 35 SS, 193/35 YE, 35 C; 198/790, 791, 789

[56] References Cited

U.S. PATENT DOCUMENTS

| 2,609,917 | 9/1952 | Gotthardt | 193/35 R X |
| 2,983,352 | 5/1961 | DeFlora et al. | 193/35 R |
| 4,089,399 | 5/1978 | Webb | 193/35 SS |

Primary Examiner—Robert B. Reeves
Assistant Examiner—Gene A. Church
Attorney, Agent, or Firm—Connolly and Hutz

[57] ABSTRACT

This invention relates to a roller conveyor and its track. Several inverted U-shaped supporting tracks are provided in sequence, which carry flanged rollers projecting above them. Alignment is secured by milling right-angular flats on the edges of the U-shaped track and shaft of the rollers which mate with each other and by providing relatively elongated bolt holes in the side mounting plates of the roller assemblies.

5 Claims, 2 Drawing Figures

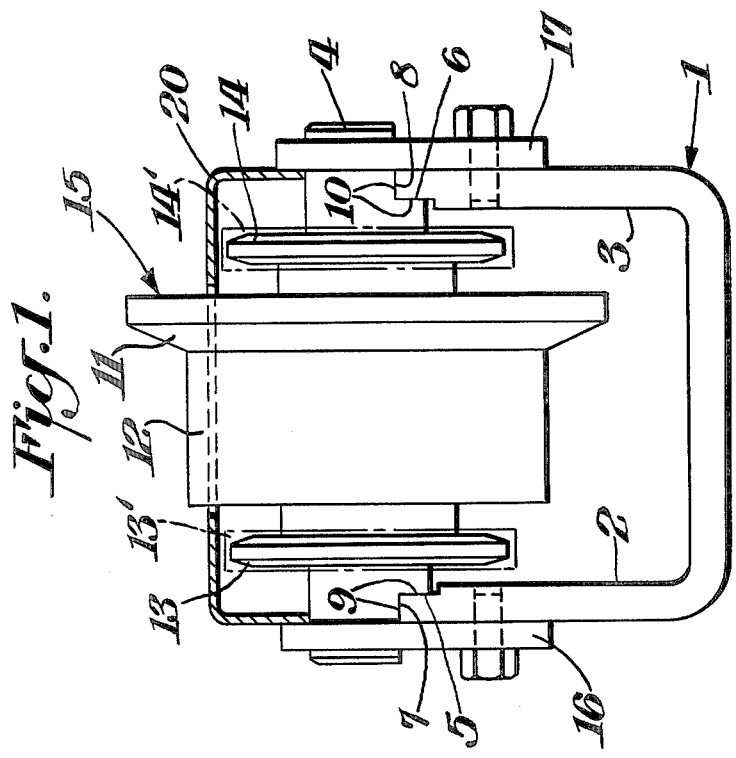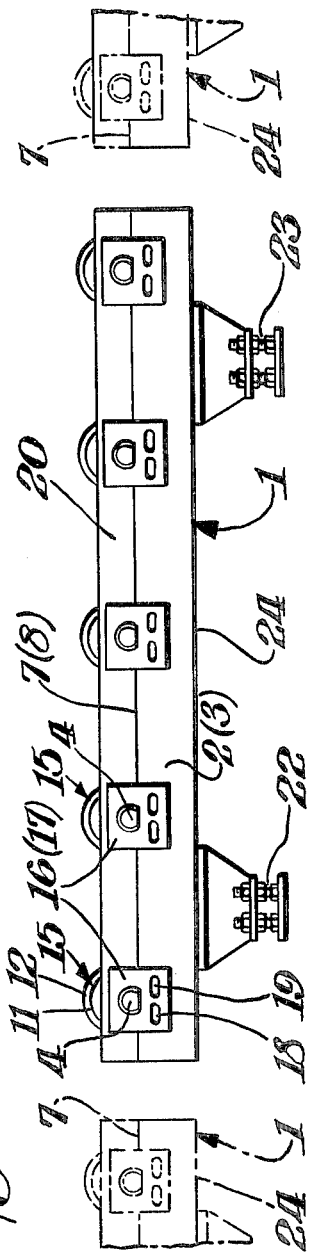

4,248,341

ROLLER CONVEYOR AND ITS TRACK

BACKGROUND OF THE INVENTION

Roller conveyor tracks of the previously-mentioned type are utilized for conveying freight goods and also in foundries for conveying castings. Particularly in the use of such roller conveyor tracks in freight transloading, there occurs a particular problem in the alignment of such roller conveyor tracks when freight goods are to be transported over longer stretches and when at the points of transfer a smooth transfer to another conveyor must take place. Furthermore, each flanged roller track per se must be aligned with considerable care, i.e. from flanged roller to flanged roller, as well as to the other flanged roller track in order to provide a smooth conveyance of fragile goods. Furthermore, in such an alignment, which can occur with a very rough tolerance, there occurs overloading concentrated at points between the underside of the freight goods and the flanged roller carrying these goods, something which can lead to sudden wear and to an abrupt failure of the flanged roller, with the consequence of a breakdown of the entire roller conveyor track.

Furthermore, with such roller conveyor tracks, when several such sections are arranged in sequence, either all or a certain proportion of the flanged rollers are operable usually by means of a chain drive. Both the susceptibility to breakdowns of such drive as a result of overloading as well as the danger of injury for the operating personnel by such roller conveyer tracks are known. Previously no efforts have been made with respect to safety and in view of servicing. It was accepted that considerable down time would occur if upon the breakdown of a chain drive, the entire roller conveyor track would have to be realigned. Emanating from this state of the art, the object of the invention is to propose a construction and alignment process as well as a roller conveyor track produced accordingly for supporting and carrying flanged rollers. The danger of injuries by driving parts, such as chain and sprocket wheels, being avoided, and whereby the possibility is additionally provided of being able to carry out chain tensioning without having to readjust the entire roller conveyor track.

SUMMARY

The object is solved according to the invention in that the sides of the U-shaped supporting track carrying the flanged rollers are machined on each top and upper inner edge and ends of each flanged roller shafts have plane flats, extending at right angles to such other axially and radially which engage the machined edges with narrow tolerances. By this construction process it is achieved that the contact surfaces of the flanged rollers are maintained in a plane, even if a misalignment of the flanged rollers occurs reciprocally in conveying direction due to a resultant tensioning of driving chains. Furthermore, by the novel process it is also achieved that the alignment of the flanges is positively maintained and thus a tilting of the individual flanged rollers is positively avoided, because owing to the machining of the matching surfaces, the axes of the flanged rollers are aligned at right angles to the U-shaped supporting track. A further considerable advantage resides in the machined sides being suitable for receiving a covering shield for the entire "roller conveyor track".

An embodiment of the novel process, providing an aligning adjustment of a roller conveyor track consisting of a plurality of U-shaped supporting tracks arranged in sequences effect alignment of the sides of the tracks by adjustable elements arranged between the base of the U-shaped supporting tracks. Owing to the alignment of the roller conveyor track in accordance with the machined side edges, assurance is given even on completely uneven ground and twisted supporting means, that the side edges and thus also the roller conveyor track consisting of individual flanged rollers, proceeds entirely evenly. A uniform bearing pressure on all flanged rollers, particularly with the carrying of heavy loads, is assured.

A roller conveyor track, constructed and aligned in accordance with the process, with a plurality of U-shaped supporting tracks, arranged in sequence, which carry flanged rollers within their open sides, with mountings for the flanged rollers on the supporting track and with chain drives collaborating with the flanged rollers, is distinguished in that the mountings have centrally elongated slots which are arranged parallel to the side edges. By the arrangement of the elongated slots parallel to the side edges, it is achieved, even with a misalignment of the flanged rollers in or opposite to the conveying direction, which results from the tensioning or retensioning of the chains driving the flanged rollers, that the original alignment is not altered with respect to the flange and with respect to the peripheral contact surfaces.

A novel embodiment of the roller conveyor track includes a covering plate, supported on the sides, with cutouts for the flanged roller shafts, covering the U-shaped channel of the supporting track. This embodiment has the particular advantage that during the operation of the installation, securely covered chains and sprocket wheels prevent accidents and only the flanged rollers protrude from the cover as far as it is absolutely necessary for the conveyance of loads.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is an end elevational view of the roller conveyor track shown in FIG. 2; and FIG. 2 is a side view in elevation of a novel roller conveyor track which is one embodiment of this invention in collaboration with such further roller conveyor tracks shown in phantom outline.

DESCRIPTION OF THE PREFERRED EMBODIMENTS

According to FIG. 1, a U-shaped supporting track 1 has its sides 2, 3, milled over their entire length at upper inner edges 5, 6, so that a flanged roller shaft 4 may be arbitrarily slid along the U-shaped supporting track. At the same time, side top edges 7, 8 of the U-shaped supporting track 1 are also face-milled over the entire length of the supporting track. There results a precise guiding arrangement operating in two planes, wherein the flanged roller shaft 4 may be mounted and particularly because of the radially and axially extending flats 9, 10 on the flanged roller shafts 4. Since the tolerance of the radial and axial flats is maintained within very narrow limits, a precise alignment of all rollers supported on this supporting track is assured and particularly with respect to each flange surface 11 and each peripheral roller surface 12.

On the flanged roller shaft 4 there are turnably supported on the same axes sprocket wheels 13, 14, which are connected with a rotatably supported flanged tread roller 15. For example, if the flanged tread roller 15 is driven by chain 13', shown in phantom outline, which is connected between a non-illustrated motor and the drive sprocket wheel 13, and should the drive of a further flanged tread roller occur by means of the chain 14' slung over sprocket wheel 14, it is necessary to release shaft support plate 16, 17 for the tensioning of the chains in order to be able to move the flanged roller shaft 4 along surfaces 5, 6, and 7, 8. Owing to the machining of these surfaces and owing to the corresponding precisely machined flat 9, 10 on flanged roller shafts 4, even upon moving, no change in the level of the tread roller surface 12 or in the lateral position of flanged surface 11 results. The previously strongly required readjustment is thus eliminated.

As illustrated in FIG. 2, shaft support plate 16 and 17 has laterally elongated slots 18, 19, which are arranged parallel to the top edges 7 or 8 of sides 2 and 3 of track 1.

On the top edges 7, 8, there is supported at the same time an inverted U-shaped cover 20, which as illustrated in cross section in FIG. 1, covers the entire drive, except for slots which free the part of the flanged tread roller 15 required for the conveyance of freight.

In FIG. 2 is illustrated the collaboration of several U-shaped supporting tracks 1 and particularly by means of adjustable elements 22, 23. Each U-shaped supporting track 1 has a pair of adjustable elements 22, 23 in order that the top edges 7 or 8 of sides 2 or 3 of all U-shaped supporting means 1 may be aligned to an even plane. As shown in FIG. 2, the base may have any desired surface. Similarly, it would be feasible that the underside 24 of the U-shaped supporting track 1 have any desired contour, something which occurs particularly with respect to rolled girders.

We claim:

1. A roller conveying track having a U-shaped track carrying flanged rollers within an open top and flanged rollers having shafts on sides thereof comprising top and upper inner edges on the sides of the U-shaped supporting track, sprocket and chain drives connected to the rollers and disposed within the track, precisely machined surfaces on the top and upper inner edges, precisely machined flats on the flanged roller shafts disposed parallel and perpendicular to the axes of the flanged roller shafts, shaft support plates secured by adjustable means to the outside of the U-shaped track, the flanged roller shafts being received in the shaft support plates, the adjustable means including longitudinal slots in the support plates whereby the sprockets and chains may be tensioned without misaligning the rollers, and the edges and flats being constructed and arranged to engage each other whereby the axes of the flanged roller shafts are maintained precisely aligned at close tolerances.

2. A roller conveying track as set forth in claim 1, wherein a covering plate extending along the length of the track is provided, and the covering plate has cut-outs disposed along one of its sides for engaging over the flanged roller shafts to facilitate installation over a portion of the open top of the U-shaped track.

3. A roller conveying track as set forth in claim 2, wherein the cover plate has a U-shaped cross section to cause it to extend over the open top whereby the drives are shielded.

4. A roller conveying track as set forth in any one of claims 2 or 3, wherein the cover plate has slots which are disposed in close proximity to the flanged rollers.

5. A roller conveying track as set forth in any one of claims 1, 2 or 3, wherein a sequence of such roller conveying tracks are provided in substantial alignment with each other.

* * * * *